(12) United States Patent
Pautis et al.

(10) Patent No.: US 11,332,255 B2
(45) Date of Patent: May 17, 2022

(54) PRIMARY STRUCTURE OF A STRUT FOR BEARING AN AIRCRAFT POWER PLANT, THE REAR PART OF WHICH IS FORMED BY A SET OF CONNECTING RODS

(71) Applicant: Airbus Operations (S.A.S.), Toulouse (FR)

(72) Inventors: Olivier Pautis, Merville (FR); Jérôme Colmagro, Toulouse (FR); Jonathan Blanc, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 472 days.

(21) Appl. No.: 16/352,332

(22) Filed: Mar. 13, 2019

(65) Prior Publication Data

US 2019/0283890 A1    Sep. 19, 2019

(30) Foreign Application Priority Data

Mar. 15, 2018 (FR) ...................................... 1852228

(51) Int. Cl.
*B64D 27/26* (2006.01)

(52) U.S. Cl.
CPC ........ *B64D 27/26* (2013.01); *B64D 2027/264* (2013.01)

(58) Field of Classification Search
CPC .............. B64D 27/26; B64D 2027/264; B64D 2027/262; B64D 2027/266
See application file for complete search history.

(56) References Cited

U.S. PATENT DOCUMENTS

| 4,560,122 A * | 12/1985 | Parkinson | B64D 27/18 244/54 |
| 5,775,638 A * | 7/1998 | Duesler | B64D 27/18 244/54 |
| 9,567,090 B2 * | 2/2017 | Gallet | B64D 27/26 |
| 10,597,144 B2 * | 3/2020 | Fotouhie | B64D 27/18 |

(Continued)

FOREIGN PATENT DOCUMENTS

FR    2 995 282 A1    3/2014

OTHER PUBLICATIONS

French Search Report and Written Opinion for Application No. 1852228 dated Oct. 16, 2018.

*Primary Examiner* — Nicholas McFall
(74) *Attorney, Agent, or Firm* — Jenkins, Wilson, Taylor & Hunt, P.A.

(57) ABSTRACT

A primary structure of a strut for bearing an aircraft power plant including a front part intended to be joined to an aircraft power plant and a rear part intended to be joined to a structure of the aircraft, the front part being formed from a box including an upper longitudinal member, a lower longitudinal member, and lateral panels. A main rib is located at an interface between the front part and the rear part. The rear part is formed from a set of four connecting rods. The first end of each connecting rod is joined to the front part of the primary structure and the second end of each connecting rod is joined to a separate interface for fastening to the structure of the aircraft. This allows a substantial simplification of the primary structure of a strut for bearing an aircraft power plant, which can have advantages in particular in terms of cost, mass, and simplicity of implementation and integration.

9 Claims, 4 Drawing Sheets

(56) References Cited

U.S. PATENT DOCUMENTS

| | | | |
|---|---|---|---|
| 2005/0274485 A1* | 12/2005 | Huggins | B64D 27/26 164/349 |
| 2008/0217467 A1* | 9/2008 | Lafont | B64D 27/18 244/54 |
| 2009/0084893 A1* | 4/2009 | Balk | B64D 27/26 244/54 |
| 2011/0192933 A1* | 8/2011 | Guering | B64D 27/26 244/54 |
| 2012/0305700 A1 | 12/2012 | Stuart et al. | |
| 2015/0251768 A1* | 9/2015 | Woolley | B64D 27/12 244/54 |
| 2016/0159487 A1* | 6/2016 | Kang | B64D 27/26 244/54 |
| 2017/0197723 A1 | 7/2017 | Nakhjavani et al. | |

* cited by examiner

PRIMARY STRUCTURE OF A STRUT FOR BEARING AN AIRCRAFT POWER PLANT, THE REAR PART OF WHICH IS FORMED BY A SET OF CONNECTING RODS

CROSS-REFERENCE TO RELATED APPLICATION

This application claims priority to French Patent Application FR 1852228, filed Mar. 15, 2018, the entire disclosure of which is incorporated by reference herein.

TECHNICAL FIELD

The disclosure herein relates to the field of struts for bearing an aircraft power plant.

BACKGROUND

In an aircraft, a strut is an element which forms the joint between a propulsion assembly or power plant, and the structure of the aircraft, for example at the wing unit thereof or at the fuselage thereof.

The strut comprises a primary structure which allows the absorption and the transmission of the efforts to which the strut is subjected, and a secondary structure mainly corresponding to an aerodynamic fairing which has no structural role. The fairing or secondary structure furthermore makes it possible to cover the cabling and tubing joining a power plant to the rest of the aircraft.

The primary structure includes, in a known manner, a box general structure. Such a composition of the primary structure gives the strut a high degree of stiffness and a high degree of strength, which are necessary for transmitting the efforts between the power plant and the structure of the aircraft, while guaranteeing a low mass.

The primary structure of the strut further includes attachments intended to join the strut to the structure of the aircraft, firstly, and to the power plant, secondly.

The primary structure of an aircraft strut can have a complex shape including boxed truncated pyramids, as shown in the appended FIGS. 1 and 2.

This conventional structure is nevertheless complex. A primary structure made according to the prior art is expensive to produce, due to the complexity of machining and assembling the constituent pieces thereof, and the large dimensions of these pieces.

SUMMARY

An aim of the disclosure herein is to propose a primary structure of an aircraft strut including an optimized structure, particularly in terms of the production cost thereof.

Thus, the disclosure herein relates to a primary structure of a strut for bearing an aircraft power plant including a front part intended to be joined to an aircraft power plant and a rear part intended to be joined to a structure of the aircraft. The front part is formed from a box including an upper longitudinal member, a lower longitudinal member, and lateral panels. The primary structure includes a main rib located at an interface between the front part and the rear part. The rear part is formed from a set of connecting rods, each connecting rod including a first end and a second end, the first end of each connecting rod being joined to the front part of the primary structure and the second end of each connecting rod being joined to a separate interface for fastening to the structure of the aircraft. There are four connecting rods, the intersection of the main rib with the front part of the primary structure forming a quadrilateral including four corners, one connecting rod being joined to the front part substantially at each of the corners.

The formation of the rear part by a set of connecting rods offers a substantial simplification of the primary structure of a strut for bearing an aircraft power plant. The dimensions of some elements (longitudinal members, lateral panels) are reduced. Thus, the disclosure herein allows a substantial reduction of the cost of manufacturing the primary structure. Furthermore, the integration of the primary structure into an aerodynamic fairing (secondary structure) can be simplified.

Each connecting rod can be joined using a hinged or ball joint to the front part, at separate joining points.

Each connecting rod can, over at least the majority of the length thereof, be formed either from a flat bar, or from two parallel flat bars, or from a tube with a triangular, square, rectangular or round section.

The set of connecting rods can include so-called lower connecting rods and so-called upper connecting rods. The lower connecting rods and the upper connecting rods can have, over at least the majority of the respective length thereof, different sections, respectively. The lower connecting rods can have a length that is different to the upper connecting rods.

The main rib can be lengthened, beyond the upper longitudinal member of the front part of the primary structure, such as to form a plane for fastening to a structure of the aircraft.

An intersection of the main rib with a plane parallel to the lower longitudinal member can be inclined with respect to a transverse direction, which is orthogonal in this plane to a longitudinal direction corresponding to the extension direction of the front part of the primary structure.

The lateral panels of the front part can each include an extension, beyond the main rib, each extension including at least one eyelet for fastening a connecting rod.

Each interface for fastening to the aircraft structure joined to the second end of a connecting rod can include a hinged or ball joint with the second end of the connecting rod, and a plate for joining to the structure of the aircraft.

The disclosure herein also relates to an aircraft including at least one wing, at least one power plant being fitted under the wing, the power plant being joined to a structure of the wing by a bearing strut including a primary structure as described above.

BRIEF DESCRIPTION OF THE DRAWINGS

Other features and advantages of the disclosure herein will further emerge from the description hereafter.

In the appended and example drawings, given as nonlimiting examples.

Figure 3:
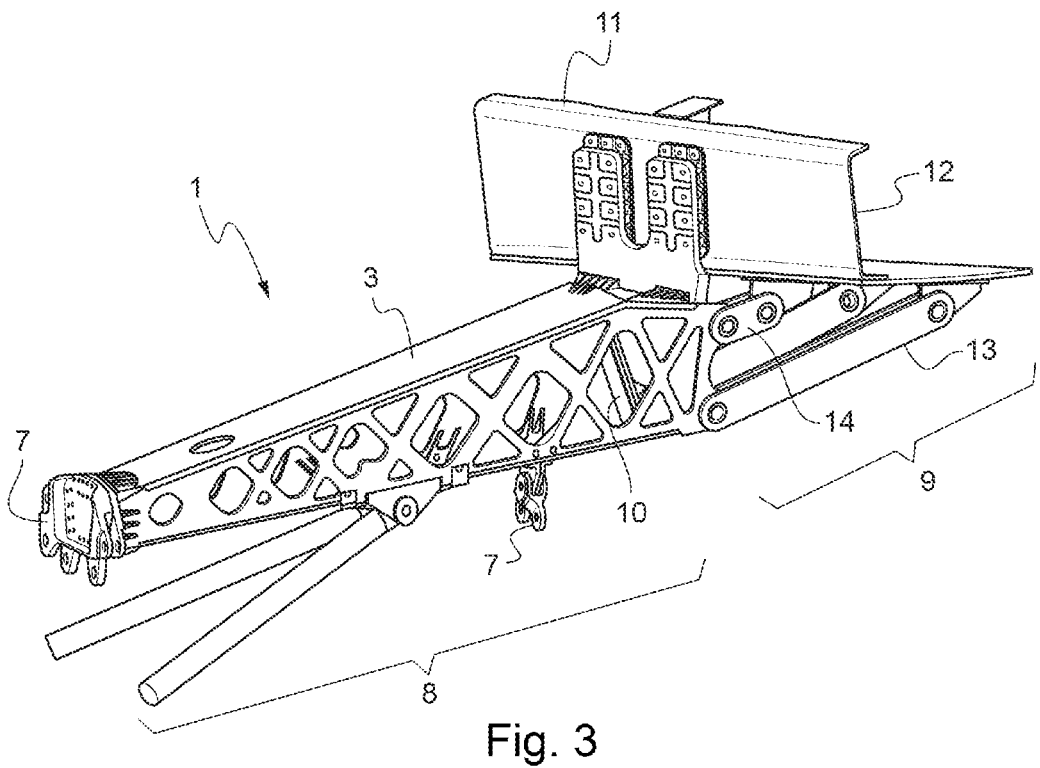
FIG. 3 is a three-dimensional schematic view of an aircraft power plant bearing strut primary structure according to an embodiment of the disclosure herein.
Figure 4:
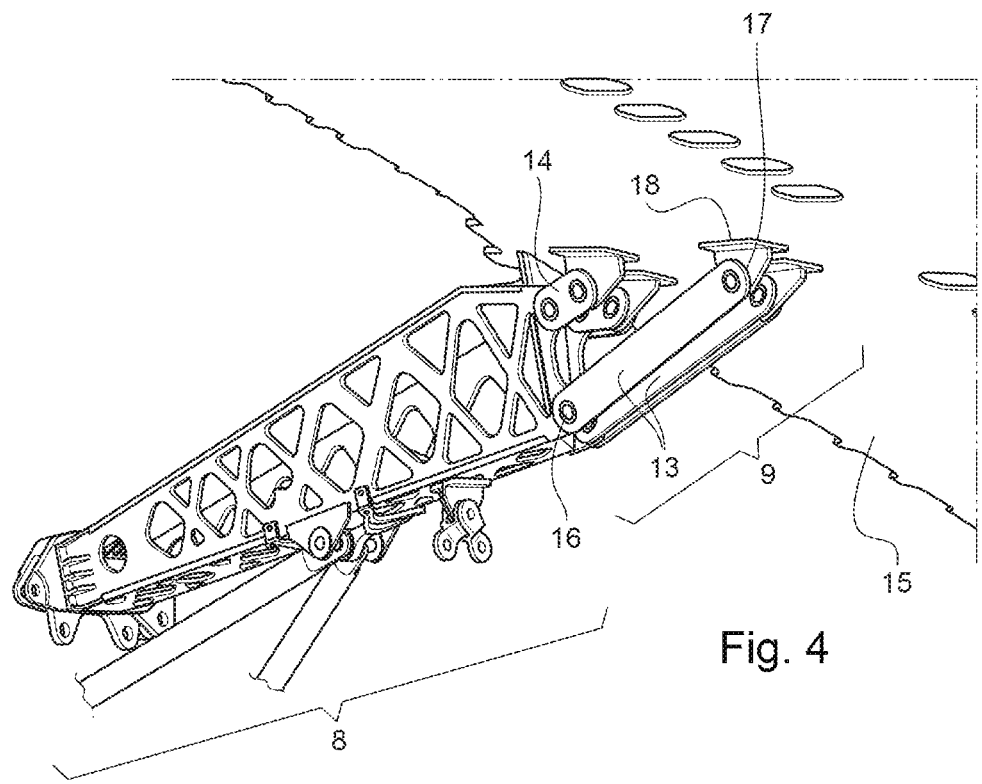
FIG. 4 shows the aircraft power plant bearing strut primary structure of FIG. 3 according to another viewpoint.
Figure 5:
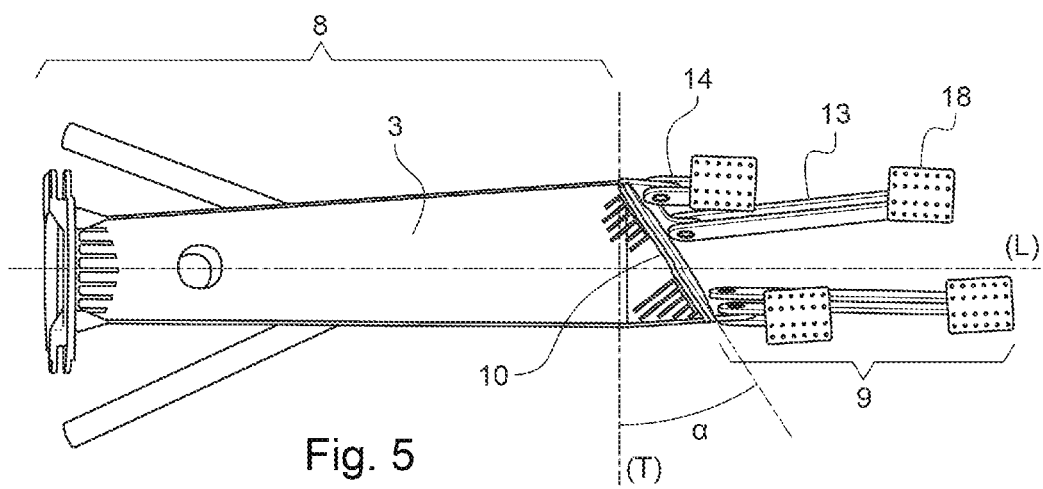
FIG. 5 is a three-dimensional schematic view of the aircraft power plant bearing strut primary structure of FIGS.
Figure 6:
Figure 7:
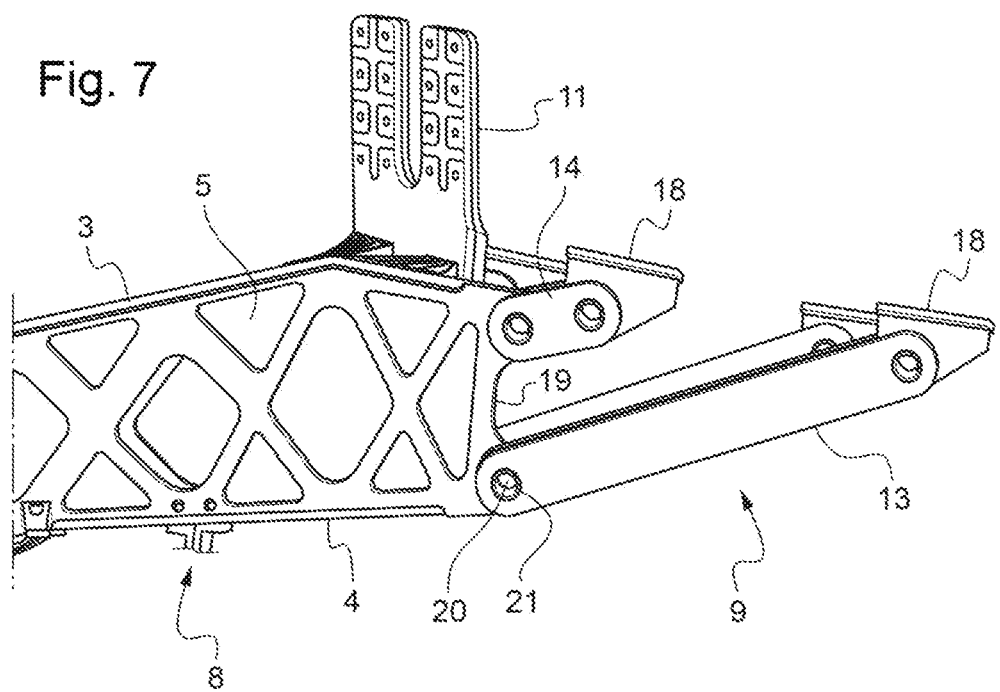
Figure 8:
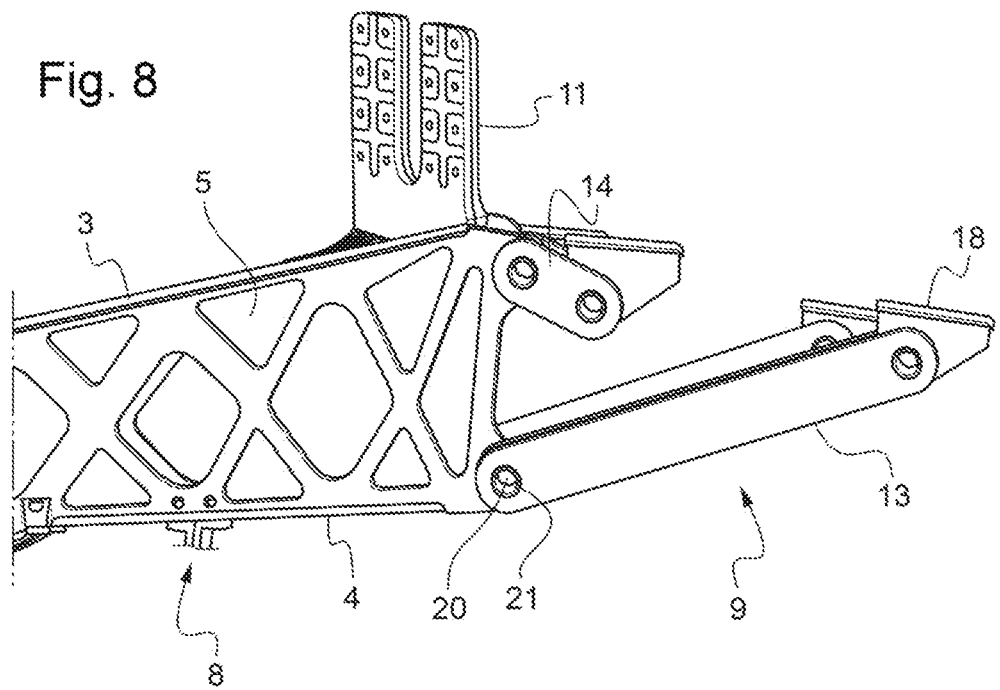

3 and 4 as a top view, with the upper longitudinal member of the primary structure in the foreground;

FIG. 6 shows, as a sectional view, various sections which can be envisaged for the connecting rods used in the disclosure herein;

FIG. 7 is a three-dimensional partial view of a detail of the aircraft power plant bearing strut primary structure of FIGS. 3 through 5;

FIG. 8 shows a view similar to that of FIG. 7 of a variant of an aircraft power plant bearing strut primary structure according to an embodiment of the disclosure herein.

DETAILED DESCRIPTION

Figure 1:
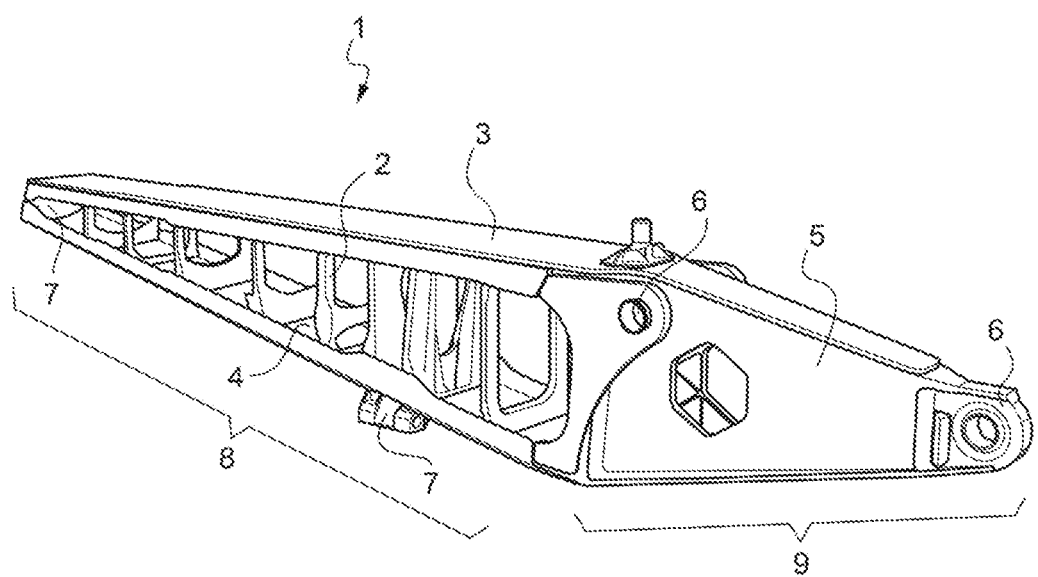
FIG. 1 is a three-dimensional schematic view of a first example of an aircraft power plant bearing strut primary structure as known from the prior art.

FIG. 1 shows an aircraft power plant strut primary structure as known from the prior art.

In an aircraft, a strut is an element which forms the joint between a propulsion assembly or power plant, including an engine and a nacelle, and a structure of the aircraft, generally at the wing unit thereof or at the fuselage thereof.

The strut comprises a primary structure which allows the absorption and the transmission of the efforts to which the strut is subjected, and a secondary structure mainly corresponding to an aerodynamic fairing which has no structural role.

The primary structure 1 includes a number of substantially parallel ribs 2. To form the primary structure, an upper longitudinal member 3, a lower longitudinal member 4 and lateral panels 5 are fastened onto the ribs 2, which makes it possible to obtain a box structure. In FIG. 1, some lateral panels 5 are not shown in order to leave the internal structure of the primary structure 1 visible. Such a box structure gives the primary structure, and therefore the strut, a high degree of stiffness and a high degree of strength, which are necessary to transmit the efforts between the power plant and the structure of the aircraft.

The primary structure of the strut further includes attachments intended to join the strut to the structure of the aircraft, firstly, and to the power plant, secondly. More precisely, the primary structure includes interfaces for fastening to the aircraft 6, and interfaces for fastening to the power plant 7.

The primary structure comprises two parts: a front part 8, mainly joined to the power plant, and a rear part 9, mainly joined to the aircraft.

To do away with the use of certain ribs, longitudinal members 3, 4 and/or lateral panels 5 strengthened by ribs or having a honeycomb structure, for example of the ISOGRID (registered trademark) type, can be used.

Figure 2:
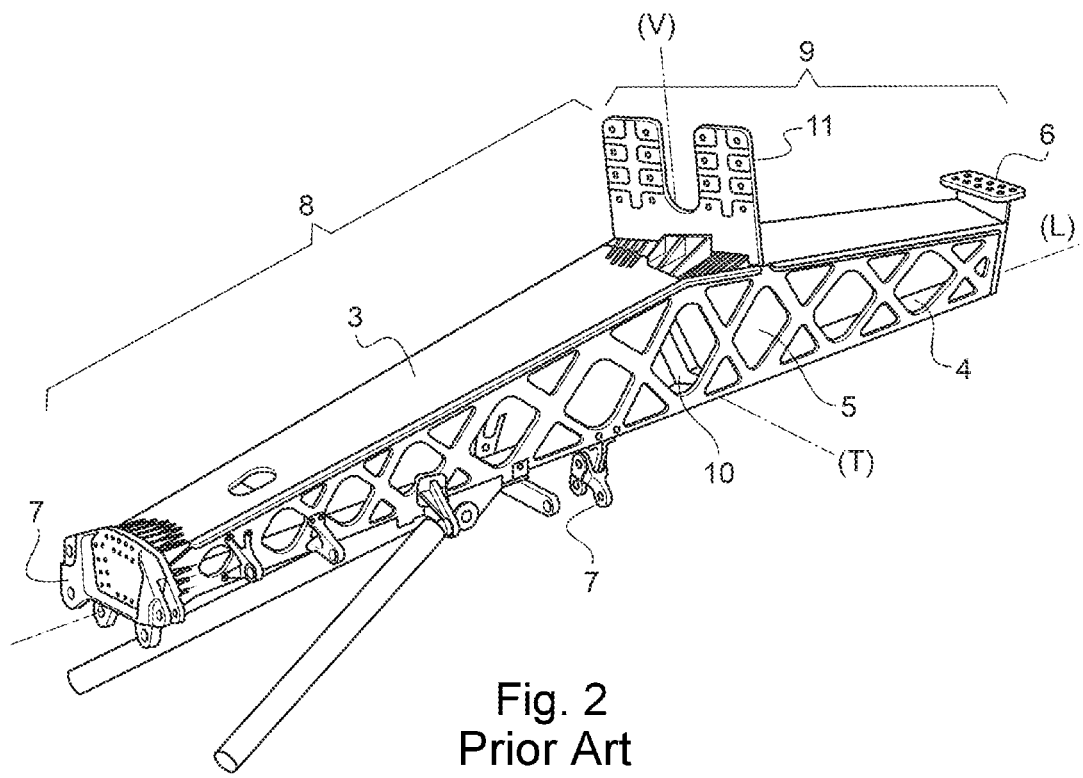
FIG. 2 is a three-dimensional schematic view of a second example of an aircraft power plant bearing strut primary structure as known from the prior art.

FIG. 2 shows a second example of an aircraft power plant bearing strut primary structure according to the prior art. In this example, the upper longitudinal member 3, the lower longitudinal member 4, and the lateral panels 5 have a honeycomb, or apertured, configuration, allowing significant mechanical properties to be obtained while offering a restricted mass.

The primary structure extends along a general direction called the longitudinal direction L. A transverse direction T is defined as the direction orthogonal to the longitudinal direction L, and which is parallel to a surface of the lower longitudinal member 4. The vertical direction V is orthogonal to the longitudinal direction L and to the transverse direction T.

Compared with the structure of FIG. 1, the number of ribs used in the example of FIG. 2 is clearly less. The primary structure thus mainly includes a main rib 10. The main rib 10 is located at the interface between the front part 8 and the rear part 9 of the primary structure. The main rib 10 has a lengthening 11 beyond the upper longitudinal member 3, i.e. on the outside of the box formed by the primary structure 1.

The lengthening 11 of the main rib 10 forms a plane for the fastening of the strut to the structure of the aircraft. In the example shown, the main rib 10, and consequently the lengthening 11 thereof, extends substantially vertically, and is inclined with respect to the transverse direction T. Thus, the main rib 10 is not orthogonal to the longitudinal direction L which corresponds to the general direction in which the strut extends. In other words, the intersection of the main rib 10 with a horizontal plane parallel to the lower longitudinal member is inclined with respect to the transverse direction, which is orthogonal in this plane with respect to the longitudinal direction for extension of the primary structure.

Indeed, since such a strut is intended to be fastened under a wing of the aircraft, the inclination of the main rib can correspond to the sweep of the wing of the aircraft, or at the very least to the angle formed by a structural part of the wing to which it is fixed (typically a wing spar) with respect to the fuselage of the aircraft, such that the fitted strut extends parallel to the fuselage.

The interface for fastening to the aircraft 6, which interface is positioned at the end of the rear part 9 of the primary structure, differs from that of the embodiment of FIG. 1 in that it is in the form of a plate for joining to the structure of the aircraft.

FIG. 3 shows a strut primary structure 1 in accordance with an embodiment of the disclosure herein consisting in or including an optimization of the primary structure presented in FIG. 2. In FIG. 3, the primary structure 1 is shown to be mounted on an aircraft structure, which is partially shown.

In this embodiment, the front part 8 of the primary structure 1, which extends as far as the main rib 10, has a configuration identical to the front part 8 of the primary structure of FIG. 2.

In particular, the main rib 10 has a lengthening 11 forming a plane for fixing to a structure of the aircraft. More precisely, the lengthening 11 is fastened to a wing spar 12.

In the disclosure herein, the box structure of the primary structure is limited to the front part 8 thereof. The rear part 9 is made up of a set of connecting rods 13, 14.

FIG. 4 shows the same device as FIG. 3, according to another viewpoint for a better view of the composition of the rear part 9 according to the disclosure herein. The wing 15 of the aircraft is partially shown. In the embodiment example shown here, the rear part 9 is mainly made up of four connecting rods, namely two lower connecting rods 13 and two upper connecting rods 14.

The term connecting rod corresponds in this case to a straight joining piece, suitable for absorbing a traction/compression effort.

Each connecting rod 13, 14 is joined by a first end 16 to the front part 8 of the primary structure, and by a second end 17 to the structure of the aircraft. The joining of the connecting rods 13, 14 to the structure of the aircraft is in this case produced via an interface which includes a joining plate 18. The joining plate allows joining to the surface of structural elements at the lower surface of the wing 15. Each of the second ends 17 is joined to the structure of the aircraft by a joint independent of the joint of the other connecting rods. Thus, each connecting rod 13, 14 is joined to the aircraft at a different joining point, via a separate fastening interface.

The distribution of the joining points of the connecting rods 13, 14, at the lower surface of the wing 15, can be seen in FIG. 5 which shows the device of FIGS. 3 and 4 as a "top" view, i.e. with the upper longitudinal member 3 seen from the front.

Due to the inclination, according to the angle α, of the main rib 10 with respect to the transverse direction T, the lower connecting rods 13 having a substantially identical length and the upper connecting rods 14 having a substantially identical length, the connecting rods are joined to the structure of the aircraft at four longitudinally distributed points. This allows a good distribution of the efforts transmitted to the structure.

In particular, the upper connecting rods 14 can have an extremely horizontal orientation, i.e. substantially parallel to the main axis for extension of the primary structure, such as to be able to absorb the efforts orientated in the direction of the engine axis of the power plant joined to the primary structure. The lower connecting rods are then mainly used for absorbing the moment caused by the vertical efforts being exerted on the primary structure.

Furthermore, the main rib 10 can have, in addition to the structural role thereof, the function of closing the end of the front part 8.

In the embodiment detailed with reference to FIGS. 3 through 5, each connecting rod is mainly made up of two bars, namely two flat bars. This configuration particularly makes it possible, by providing concentric holes in each bar at the first end 16 of the connecting rod and/or at the second end 17 of the connecting rod, to form a yoke allowing a hinged joint with the front part 8 of the primary structure and/or the structure of the aircraft (or the interface for joining to the structure of the aircraft), respectively.

Indeed, each connecting rod 13, 14 is advantageously joined by a hinged joint or a ball joint at each of the ends thereof. This guarantees that the connecting rod works in traction/compression and limits the residual efforts in the connecting rods in the absence of mechanical stress by the power plant.

Besides the composition of two flat bars that is presented in FIGS. 3 through 5, the connecting rods 13, 14 which are used in the disclosure herein can have various alternative configurations presented in FIG. 6. More precisely, FIG. 6 shows various connecting rod cross-sections that can be used in the disclosure herein. Thus, each connecting rod can, for example, be formed, according to the sections presented from left to right in FIG. 6, from two flat bars, one flat bar, one bar having a cross-shaped section, or a tube with a rectangular (for example square), circular (or oval) or triangular section.

According to the joints produced at the first and second ends 16, 17, a connecting rod can have one of the sections illustrated in FIG. 6 over the entire length thereof, or over the majority of the length thereof, and for example over the majority of the length thereof apart from the ends 16, 17 in order to form the joints.

Each connecting rod can furthermore have a different section. For example, the lower connecting rods can have an identical section, different to that of the upper connecting rods. In particular, the lower connecting rods 13 can have a circular section offering better device stability. Thus, in an advantageous embodiment, the upper connecting rods 14 are flat, whereas the lower connecting rods are mainly made up of a tube, preferably having a round section (circular).

FIG. 7 shows a detail view of the device of FIGS. 3 through 5, at the joint between the front part 8 and the rear part 9 of the primary structure. The intersection of the main rib 10 with the box of the primary structure (i.e. typically the geometry defined by the box of the primary structure of FIG. 2) defines a four-cornered quadrilateral from which a joint is formed with the first end 16 of a connecting rod 13, 14. In the example shown in this case, the lateral panels 5 each have at least one longitudinal extension 19 beyond the main rib 10. At the upper part (on the upper longitudinal member 3 side) and at the lower part (on the lower longitudinal member 4 side), the extension 19 includes an eyelet 20 allowing a yoke pin 21 to pass through in order to form a hinged joint.

As shown in FIG. 7 for example, a yoke-type hinged joint, similar to the joint formed with the front part, can be formed with the interface including a plate 18, at the second end 17 of each connecting rod.

The embodiment of FIG. 7 is based on a pre-existing geometry, from the prior art, of an aircraft power plant bearing strut primary structure. The embodiment shown in FIG. 8 corresponds to a geometric optimization of the primary structure permitted by the use of a rear part 9 in accordance with the disclosure herein, made up of connecting rods. As shown in FIG. 7, the inclination of the main rib 10 according to the angle α results in having, on one of the sides of the front part 8, a lateral panel 5 having a substantially triangle or quadrilateral shape, and on the other side (shown in the foreground of FIG. 7), a panel with a complex shape. The upper longitudinal member 3 furthermore has a chisel edge, which increases the manufacturing cost thereof.

The embodiment shown in FIG. 8 is an optimized variant, with respect to the points stated above. In particular, the upper longitudinal member 3 has a planar shape, as far as the main rib 10. Correspondingly, the two lateral panels 5 have a simple shape, like a trapezoid or a triangle. The production costs are thus reduced, in comparison with the embodiment of FIG. 7. Furthermore, the mechanical performances are improved. This improvement is obtained thanks to the possible raising of the upper connecting rod 14 on the modified side of the primary structure compared with the embodiment of FIG. 7, the result of which is to move the upper connecting rod 14 away from the lower connecting rod 13. In practice, the upper connecting rod 14 in the foreground of FIG. 8 can be positioned in this embodiment at the same level as the upper connecting rod on the other side, or above the latter (i.e. moved further away from the lower connecting rod 13). The spacing between the connecting rods allows better absorption of the efforts in the connecting rods. In particular, the more the upper and lower connecting rods are spaced apart from one another, the less a tilting moment applied to the front part 8 (for example a vertical force applied at the end of the front part) will produce a traction/compression substantial force in the lower connecting rods.

The disclosure herein developed above allows a substantial simplification of the primary structure of a strut for bearing an aircraft power plant. This simplification, also resulting in a reduction in the length of certain elements (longitudinal members, lateral panels), allows a substantial reduction in the manufacturing cost. Although illustrated using a specific embodiment from the prior art (in this particular case a primary structure as described with reference to FIG. 2), the disclosure herein can be applied using primary structures including any type of front part 8, particularly the primary structures similar to that described with reference to FIG. 1.

Furthermore, the various joints that can be used at the ends of the connecting rods can be produced in various ways known moreover from the prior art.

The formation of the rear part via a set of connecting rods offers, in addition to a reduced production cost and a simplified implementation, other advantages or opportunities. The upper longitudinal member can be simplified, by giving it a flat shape. The central rib can have the secondary function of closing the box formed by the front part. The rear part is also less constrained by the problems of complying with an aerodynamic shape, and the integration thereof into a strut secondary structure, which mainly forms an aerodynamic fairing, is simplified.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A primary structure of a strut for bearing an aircraft power plant comprising:
    a front part to be joined to an aircraft power plant and a rear part to be joined to a structure of the aircraft;
    the front part having a box shape including an upper longitudinal member, a lower longitudinal member, and lateral panels;
    the primary structure including a main rib located at an interface between the front part and the rear part;
    wherein the main rib extends vertically beyond the upper longitudinal member of the front part of the primary structure to form a plane for fastening to the structure of the aircraft;
    wherein the rear part is formed from a set of connecting rods, each connecting rod including a first end and a second end, the first end of each connecting rod being joined to the front part of the primary structure and the second end of each connecting rod being joined to a separate interface for fastening to the structure of the aircraft; and
    wherein there are four connecting rods, an intersection of the main rib with the front part of the primary structure forming a quadrilateral including four corners, one connecting rod being joined to the front part substantially at each of the corners.

2. The primary structure according to claim 1, wherein each connecting rod is joined using a hinged or ball joint to the front part, at separate joining points.

3. The primary structure according to claim 1, wherein each connecting rod is, over at least the majority of the length thereof, formed either from a flat bar, or from two parallel flat bars, or from a tube with a triangular, square, rectangular or round section.

4. The primary structure according to claim 1, wherein the set of connecting rods comprises lower connecting rods and upper connecting rods, and wherein the lower connecting rods and the upper connecting rods have, over at least the majority of a length thereof, different sections, respectively.

5. The primary structure according to claim 1, wherein the set of connecting rods comprises lower connecting rods and upper connecting rods, and wherein the lower connecting rods have a length that is different to a length of the upper connecting rods.

6. The primary structure according to claim 1, wherein an intersection of the main rib with a plane parallel to the lower longitudinal member is inclined with respect to a transverse direction, which is orthogonal in the plane to a longitudinal direction corresponding to an extension direction of the front part of the primary structure.

7. The primary structure according to claim 1, wherein the lateral panels of the front part each include an extension, beyond the main rib, each extension including at least one eyelet for fastening a connecting rod.

8. The primary structure according to claim 1, wherein each interface for fastening to the aircraft structure, joined to the second end of a connecting rod, includes a hinged or ball joint with the second end of the connecting rod, and a plate for joining to the structure of the aircraft.

9. An aircraft comprising at least one wing, at least one power plant being fitted under the wing, wherein the power plant is joined to a mechanical structure of the wing by a bearing strut including a primary structure according to claim 1.

* * * * *